United States Patent Office 3,657,360
Patented Apr. 18, 1972

3,657,360
RECOVERY OF HYDROXYALKYL VINYL ETHERS
Frank Carluccio, Easton, Pa., and Max Eugene Chiddix, League City, Tex., assignors to GAF Corporation, New York, N.Y.
No Drawing. Filed June 12, 1970, Ser. No. 45,919
Int. Cl. C07c 41/12
U.S. Cl. 260—615 R          7 Claims

ABSTRACT OF THE DISCLOSURE

Hydroxyalkyl vinyl ethers are recovered in good yield and high purity from crude mixtures thereof which contain an alkali metal hydroxide, such as the reaction product produced by the partial vinylation of an alkylene glycol with acetylene in the presence of an alkali metal hydroxide, by converting the alkali metal or alkaline earth metal hydroxide in the crude material to an alkali metal carbonate, as by the addition to the crude material of an alkali metal acid carbonate or carbon dioxide, and distilling the crude material containing an alkali metal carbonate but essentially free of alkali metal hydroxide.

BACKGROUND OF THE INVENTION

Vinyl ethers of a number of organic hydroxy compounds are produced commercially by the reaction of a hydroxy substituted organic compound with acetylene in the presence of an alkali metal hydroxide, such as KOH, NaOH or LiOH, as described in U.S. Pat. 1,959,927, issued May 22, 1934 to W. Reppe.

By the reaction of alkylene glycols with acetylene in the presence of an alkali metal hydroxide, the divinyl ether of the glycol can be produced in good yield, if 2 molar proportions of acetylene are caused to react with 1 molar proportion of the glycol, while by the reaction of equimolar proportions of acetylene and the glycol, theoretically the hydroxyalkyl vinyl ether of the glycol may be made, as illustrated by the following equations:

(1) $C_2H_2 + HO-R-OH \rightarrow H_2C=CH-O-R-OH$ (2) $C_2H_2 + H_2C=CH-O-R-OH \rightarrow$
$H_2C=CH-O-R-O-CH=CH_2$ Wherein R is a straight or branched chain alkylene radical. However, as a practical matter, even when substantially less than 1 molar proportion of acetylene per molar proportion of glycol are reacted there is produced a mixture of the hydroxyalkyl monovinyl ether and the divinyl ether of the glycol, which still contains some of the unreacted glycol. Nevertheless, by controlling the amount of acetylene, which is reacted with the glycol, it is possible to produce materials rich in the hydroxyalkyl monovinyl ether of the glycol or rich in the divinyl ether of the glycol (the higher the relative amount of acetylene employed, under otherwise similar conditions, the higher the amount of the divinyl ether of the glycol in the product and the lower the amount of unreacted glycol in the product).

The hydroxyalkyl vinyl ethers (the monovinyl ether of the glycol) are useful monomers, particularly for use as comonomers with copolymerizable ethylenically unsaturated monomers, such as vinyl acetate, vinyl chloride, maleic anhydride, styrene and the like for the production of polymeric products having hydroxy substituted side chains. The divinyl ethers of the glycols are useful monomers, particularly for use as cross-linking comonomers with copolymerizable ethylenically unsaturated monomers, such as those mentioned above.

The hydroxyalkyl vinyl ethers, which may be distilled by the process of the present invention from crude materials containing the same in admixture with an alkali metal hydroxide, may be represented by the following general formula:

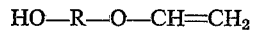

wherein R is an alkylene radical of at least 2 carbon atoms, particularly alkylene radicals of from 2 to 10 carbon atoms.

As examples of such hydroxy alkylvinyl ethers may be mentioned:

2-hydroxyethyl vinyl ether
2-hydroxypropyl vinyl ether
3-hydroxypropyl vinyl ether
4-hydroxybutyl vinyl ether
3-hydroxybutyl vinyl ether
6-hydroxyhexyl vinyl ether
1-methyl-2-hydroxy-pentyl vinyl ether
5-hydroxypentyl vinyl ether
7-hydroxyheptyl vinyl ether
8-hydroxyoctyl vinyl ether
9-hydroxynonyl vinyl ether
10-hydroxydecyl vinyl ether
11-hydroxyundecyl vinyl ether, etc.

The process of the present invention is particularly valuable in the recovery of the 2-hydroxy-3-hydroxy- and 4-hydroxyalkyl vinyl ethers since these are most likely to cyclize and form cyclic acetals as described below.

We have found that the hydroxyalkyl vinyl ethers, unlike alkylvinyl ethers, or the divinyl ethers of glycols, which are stable to alkali metal hydroxides and so can frequently be recovered in good purity by distillation in the presence of an alkali metal hydroxide, are sensitive to alkali in the form of alkali metal hydroxide, and cannot be recovered in a purity of much over 95% by distillation in the presence of an alkali metal hydroxide.

Thus 1,4-butanediol was partially vinylated by reaction with acetylene in the presence of KOH and the crude reaction product distilled under vacuum. The butanediol divinyl ether came off first and was recovered in good purity; as distillation was continued, the 4-hydroxybutyl vinyl ether distilled and was recovered. The distilled 4-hydroxybutyl vinyl ether so recovered was found to assay about 94.5 to 96.1% of product containing from 2 to 4% of a low boiling component which was identified as the cyclic acetal,

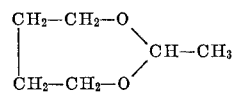

which can be formed from hydroxybutyl vinyl ether, and about 0.1 to 1.0% of a high boiler which was identified as the dimer of 4-hydroxybutyl vinyl ether. This distilled product was found to be too impure to be satisfactory for use in the production of copolymers with other vinyl compounds. Efforts to further purify this product by redistillation were not successful. Redistillation of this product without additive gave a poorer product (88.69% assay) rather than product improvement. The addition of $K_2CO_3$ solid to the distillation pot prevented deterioration of the material during redistillation, but gave essentially no improvement in product quality.

It was found however, that if prior to the distillation of the 4-hydroxybutyl vinyl ether, the KOH was neutralized by the addition of sufficient $KHCO_3$ or the introduction of sufficient $CO_2$ to convert the KOH to $K_2CO_3$, as illustrated by the following equations:

(3) $KOH + KHCO_3 \rightarrow K_2CO_3 + H_2O$ or (4) $2KOH + CO_2 \rightarrow K_2CO_3 + H_2O$ the 4-hydroxybutyl vinyl ether could then be distilled and recovered in high purity (>99% assay of product), and was satisfactory for use as a comonomer in copolymerizations with other vinyl comonomers.

In place of $KHCO_3$, other alkali metal or alkaline earth metal acid carbonates (bicarbonates) can be used, however the water soluble alkali metal bicarbonates are preferred in view of their greater rate of reactivity.

The details of the present invention will be apparent from the following specific example of a preferred embodiment thereof.

EXAMPLE 1

Part I

Into a clean dry 5 gallon stainless steel autoclave, equipped with a 4-blade turbine agitator was charged 9,000 g. 1,4-butanediol (99.67% assay)
270 g. KOH (J. T. Baker Co. Reagent Grade, 87% assay)

The autoclave head was bolted down and the system pressure tested at 300 p.s.i.g. with dry nitrogen. After testing, the system was purged three times with nitrogen by venting, pressurizing to 100 p.s.i.g. and venting again etc. The agitator was then turned on and the autoclave heated to 140° C. Nitrogen was admitted to 70 p.s.i.g. and then acetylene was admitted to 200 p.s.i.g. and this pressure was maintained by a pressure regulator. Acetylene was introduced from a cylinder placed on a weighing scale and attached to the autoclave by a loose coil of narrow-bore lightweight stainless steel tubing. Thus the rate of usage of acetylene could be followed. After 12½ hours 1,881 g. of acetylene was consumed and the addition of acetylene was stopped. The autoclave was allowed to cool to room temperature and the pressure vented. The autoclave was opened and its contents, 11,071 g. of dark drown liquid, was removed from the autoclave by suction into a distillation flask.

Part II 450 g. of $KHCO_3$ (J. T. Baker Co. Reagent Grade) was added to the flask and the material in the flask distilled through a 1½ inch diameter by 2 foot long glass column packed with 0.24 inch protruded stainless steel. During the distillation, a pressure of 5 mm. Hg and a 10% product take-off was employed. Twelve distillation fractions were collected. Fractions six through twelve possessed the correct boiling point for 4-hydroxybutyl vinyl ether. These fractions total 4,720 g. and analyzed (by vapor phase chromatography) between 99.02 and 99.54% 4-hydroxybutyl vinyl ether content.

As mentioned previously the 4-hydroxybutyl vinyl ether recovered in experiments conducted in the same manner as the foregoing example, except that no $KHCO_3$ (or other alkali metal or alkaline earth metal bicarbonate) was employed in the distillation of Part II, had a purity of about 95% (94.5 to 96.1% assay) and contained 2 to 4% of the low boiling cyclic acetal from 4-hydroxybutyl vinyl ether.

When 1,3-butanediol is employed in place of 1,4-butanediol, in the procses of the foregoing example, 3-hydroxybutyl vinyl ether of at least 99% purity is recovered.

EXAMPLE 2

Example 1 was repeated except that in Part II, instead of adding $KHCO_3$ to the distillation pot prior to distillation, $CO_2$ was bubbled through the crude material in the pot at ambient temperature until the KOH therein had been neutralized to pH 7 and converted to $K_2CO_3$. The material in the flask was then distilled and essentially the same quantity of 4-hydroxybutyl vinyl ether of >99% assay recovered.

While $KHCO_3$ was employed in Example 1 above to neutralize the KOH and convert it to $K_2CO_3$, it is entirely droxides, e.g. NaOH or LiOH, or mixtures of alkali metal acid carbonates, e.g. $NaHCO_3$, $LiHCO_3$ or $Ca(HCO_3)_2$, to neutralize the KOH and convert it to a mixture of potassium and sodium, lithium or calcium carbonate. Also, while KOH is a preferred catalyst for the vinylation (partial or complete) of glycols, other alkali metal hydroxides, e.g. NaOH or LiOH, or mixtures of alkali metal hydroxides are also effective vinylation catalysts, and the partially vinylated products which contain hydroxybutyl vinyl ether (or other hydroxyalkyl vinyl ethers if a glycol other than 1,4-butanediol is partially vinylated) along with the alkali metal hydroxide(s) used as the vinylation catalyst may be neutralized with $CO_2$ or an alkali metal acid carbonate, which may have the same or different alkali metal cation as the alkali metal hydroxide used as the catalyst, and neutralized material then distilled to recover a hydroxyalkyl vinyl ether of >99% assay.

It has been found that hydroxyalkyl vinyl ethers, such as those mentioned above are sensitive to as little as 1% alkali metal hydroxide (based on the weight of the hydroxyalkyl vinyl ether) and hydroxyalkyl vinyl ethers of sufficient purity for use as a monomer, i.e. of about 99% assay or higher, cannot be distilled therefrom. On the other hand the hydroxyalkyl vinyl ethers are quite stable on distillation in the presence of alkali metal carbonates and alkali metal acid carbonates, and hyldroxyalkyl vinyl ethers of >99% assay can be produced in accordance with the present invention by distillation of crude hydroxyalkyl viny ethers containing less than 0.01% alkali metal hydroxide, but containing up to 15% alkali metal carbonate and/or 10% alkali metal acid carbonate (based on the weight of the KOH used in the vinylation).

As previously indicated the present process is particularly useful for the recovery by distillation of high purity hydroxyalkyl vinyl ethers from partially vinylated glycols. Since from about 1 mole percent to about 5 mole percent of alkali metal hydroxide (based on the glycol being vinylated) is usually employed in such vinylation reactions, it is preferred in practising the present invention to completely neutralize the alkali metal hydroxide catalyst in the vinylation reaction product, prior to distillation thereof, and sufficient $CO_2$ or alkali metal acid carbonate is preferably used to effect such complete neutralization. When an alkali metal acid carbonate is used to effect such neutralization it is preferred to use a slight excess, preferably about 10% excess although up to 50% excess may be used, of alkali metal acid carbonate over that theoretically required to effect complete neutralization of the alkali metal hydroxide present in the product to be distilled.

We claim:

1. In the process of distilling hydroxyalkyl vinyl ethers containing an alkali metal hydroxide as an impurity, the improvement which comprises adding to such impure hydroxyalkyl vinyl ether, prior to distillation thereof, a material selected from the group consisting of carbon dioxide, alkali metal and alkaline earth metal acid carbonates in an amount essentially stoichiometrically equivalent to the alkali metal hydroxide, so that said material reacts with the alkali metal hydroxide and converts same to an alkali metal carbonate, and thereafter distilling off the hydroxyalkyl vinyl ether to thereby recover the same in a pure form of more than about 99% assay.

2. The process as defined in claim 1, wherein the hydroxyalkyl vinyl ether contains from 2 to 10 carbon atoms in the hydroxyalkyl group.

3. The process as defined in claim 1, wherein the hydroxyalkyl vinyl ether is 4-hydroxybutyl vinyl ether.

4. The process as defined in claim 1 wherein the alkali metal hydroxide is KOH, and $KHCO_3$ is added thereto.

5. The process as defined in claim 1 wherein the alkali metal hydroxide is KOH and carbon dioxide is added thereto.

6. The process as defined in claim 3, wherein the alkali metal hydroxide is KOH and $KHCO_3$ is added thereto.

7. The process as defined in claim 3, wherein the alkali metal hydroxide is KOH and carbon dioxide is added thereto.

References Cited

UNITED STATES PATENTS

| 1,959,927 | 5/1934 | Reppe | 260—615 RX |
| 2,472,084 | 6/1949 | Beller et al. | 260—615 RX |

HOWARD T. MARS, Primary Examiner